(12) United States Patent
Hu et al.

(10) Patent No.: US 11,798,135 B2
(45) Date of Patent: Oct. 24, 2023

(54) METHOD AND SYSTEM FOR THREE-DIMENSIONAL NOISE REDUCTION AND CONTRAST ENHANCEMENT OF IMAGES

(71) Applicant: GN Audio A/S, Ballerup (DK)

(72) Inventors: Shane Ching-Feng Hu, Fremont, CA (US); Cindy Le Chang, San Jose, CA (US)

(73) Assignee: GN AUDIO A/S

( * ) Notice: Subject to any disclaimer, the term of this patent is extended or adjusted under 35 U.S.C. 154(b) by 193 days.

(21) Appl. No.: 17/184,566

(22) Filed: Feb. 24, 2021

(65) Prior Publication Data

US 2022/0270213 A1 Aug. 25, 2022

(51) Int. Cl.
*G06T 5/00* (2006.01)
*G06T 5/20* (2006.01)
*G06T 19/20* (2011.01)

(52) U.S. Cl.
CPC .............. *G06T 5/002* (2013.01); *G06T 5/20* (2013.01); *G06T 19/20* (2013.01); *G06T 2207/20182* (2013.01)

(58) Field of Classification Search
CPC .......... G06T 5/002; G06T 5/20; G06T 19/20; G06T 2207/20182; G06T 2207/20012; G06T 2207/20192; G06T 5/003; G06T 5/004; G06T 5/005; G06T 5/007; G06T 5/008; G06T 5/009; G06T 2207/10016; G06T 2207/20032; G06T 2207/20008; H04N 5/21; H04N 5/57; H04N 21/44008; G06V 10/30; G06K 9/30
See application file for complete search history.

(56) References Cited

U.S. PATENT DOCUMENTS

| | | | | |
|---|---|---|---|---|
| 6,014,469 A * | 1/2000 | Eschbach | ................. | G06T 5/20 382/206 |
| 6,148,115 A * | 11/2000 | Mackinnon | ............... | G06T 5/20 382/270 |
| 9,202,267 B1 * | 12/2015 | Yang | ......................... | G06T 5/20 |
| 10,269,095 B2 * | 4/2019 | Lim | ....................... | G06T 5/002 |
| 2003/0161548 A1 * | 8/2003 | Vuylsteke | ................ | G06T 5/40 382/274 |
| 2005/0105627 A1 * | 5/2005 | Sun | .......................... | G06T 5/20 348/E5.077 |
| 2006/0013503 A1 * | 1/2006 | Kim | ....................... | G06T 5/009 382/276 |

(Continued)

FOREIGN PATENT DOCUMENTS

KR 101426610 B1 8/2014

OTHER PUBLICATIONS

Extended European Search Report dated Jul. 19, 2022, Application No. 22158444.4-1210.

*Primary Examiner* — Jose L Couso
(74) *Attorney, Agent, or Firm* — HM LAW GROUP LLP; Vani Moodley, Esq.

(57) ABSTRACT

Embodiments of the present invention disclose a system and method for reducing noise in a digital image. The method comprises calculating a spatial weight for each pixel s in a current frame, wherein said spatial weight is computed based on a summation of diffused values associated with the pixel s; and selectively filtering an intensity I of the pixel s spatially using said spatial weight.

21 Claims, 6 Drawing Sheets

(56) References Cited

U.S. PATENT DOCUMENTS

| | | | |
|---|---|---|---|
| 2008/0205785 A1* | 8/2008 | Geiger | G06T 5/004 |
| | | | 382/254 |
| 2008/0231753 A1 | 9/2008 | Fujiwara et al. | |
| 2008/0285853 A1* | 11/2008 | Bressan | H04N 5/57 |
| | | | 348/E5.119 |
| 2009/0245679 A1 | 10/2009 | Ohwaki et al. | |
| 2010/0142790 A1* | 6/2010 | Chang | G06T 5/002 |
| | | | 382/274 |
| 2011/0090351 A1* | 4/2011 | Cote | H04N 23/951 |
| | | | 348/208.1 |
| 2011/0182510 A1* | 7/2011 | Hong | G06T 5/50 |
| | | | 382/167 |
| 2012/0169936 A1* | 7/2012 | Persson | H04N 5/21 |
| | | | 348/E5.077 |
| 2013/0114895 A1* | 5/2013 | Hong | G06T 5/10 |
| | | | 382/167 |
| 2013/0201401 A1* | 8/2013 | Hirooka | H04N 5/21 |
| | | | 348/607 |
| 2014/0078347 A1* | 3/2014 | DeBattista | H04N 23/80 |
| | | | 348/241 |
| 2017/0061234 A1* | 3/2017 | Lim | G06T 3/40 |
| 2017/0278225 A1* | 9/2017 | Nishimura | G06T 5/002 |
| 2020/0058105 A1* | 2/2020 | Liu | G06T 1/20 |
| 2020/0074717 A1* | 3/2020 | Story | G06T 15/005 |
| 2022/0321923 A1* | 10/2022 | Giladi | G06T 5/002 |

\* cited by examiner

METHOD AND SYSTEM FOR THREE-DIMENSIONAL NOISE REDUCTION AND CONTRAST ENHANCEMENT OF IMAGES

FIELD

Embodiments of the present invention relate generally to image processing, more specifically to noise reduction and contrast enhancement of images.

BACKGROUND

FIG. 1 of the drawings shows a high-level block diagram of a camera 10 in accordance with the prior art. As will be seen, the camera 10 comprises a lens 12 for focusing rays of light onto an image sensor 14. The image sensor 14 may be a charge-coupled device (CCD) or an active-pixel (CMOS) sensor capable of converting the incoming light into pixels which are fed into a downstream image signal processing pipeline 16. Typically, the signal processing pipeline performs operations such as demosaicing, noise reduction, auto exposure, autofocus, auto white balance and image sharpening on pixels, prior to output.

SUMMARY

According to the first aspect of the invention, these provided a method for producing noise in a digital image A method for reducing noise in a digital image, comprising:
  calculating a spatial weight for each pixel s in a current frame, wherein said spatial weight is computed based on a summation of diffused values associated with the pixel s; and
  selectively filtering an intensity I of the pixel s spatially using said spatial weight.

According to a second aspect of the invention is provided the system for implementing the above method.

Other aspects of the invention, will be apparent from the written description below.

DETAILED DESCRIPTION

In the following description, for purposes of explanation, numerous specific details are set forth in order to provide a thorough understanding of the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not others.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Camera Pipeline with Three-Dimensional Noise Reduction and Contrast Enhancement

Figure 1:
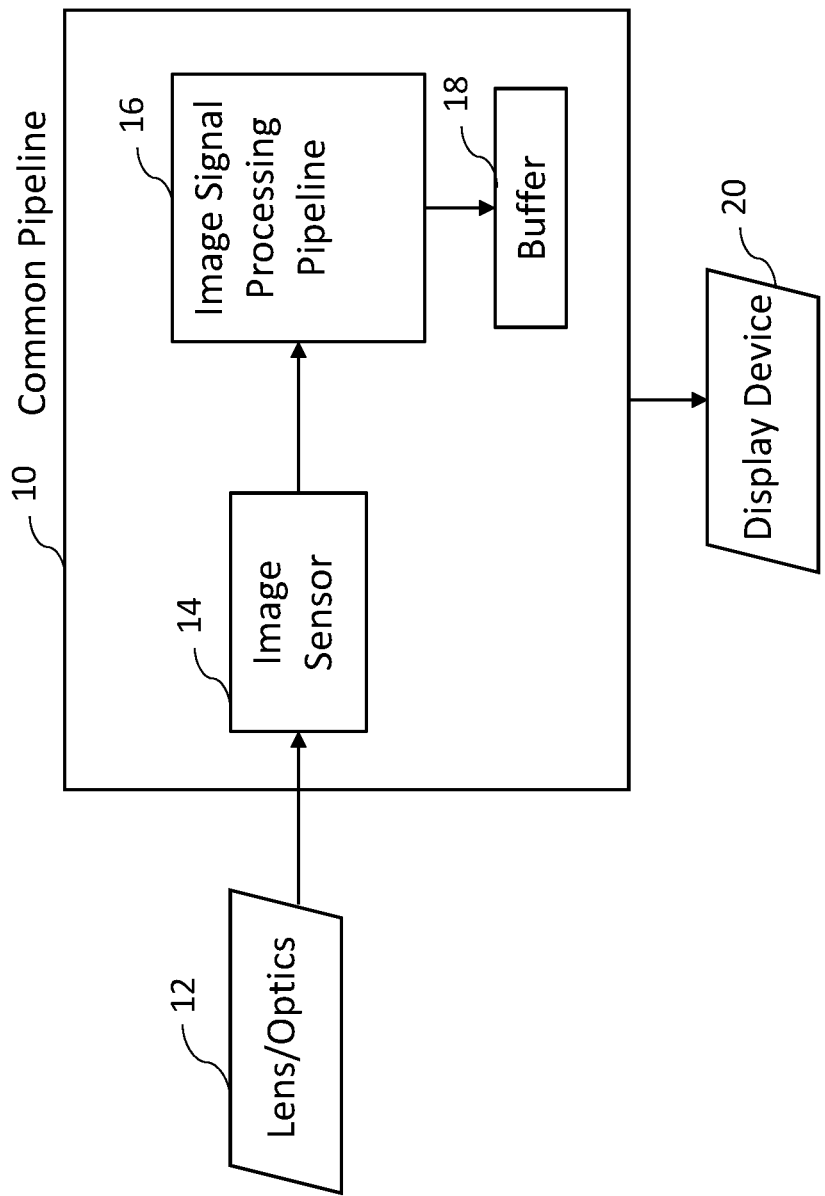
FIG. 1 shows a high-level block diagram of a prior art camera.
Figure 2:
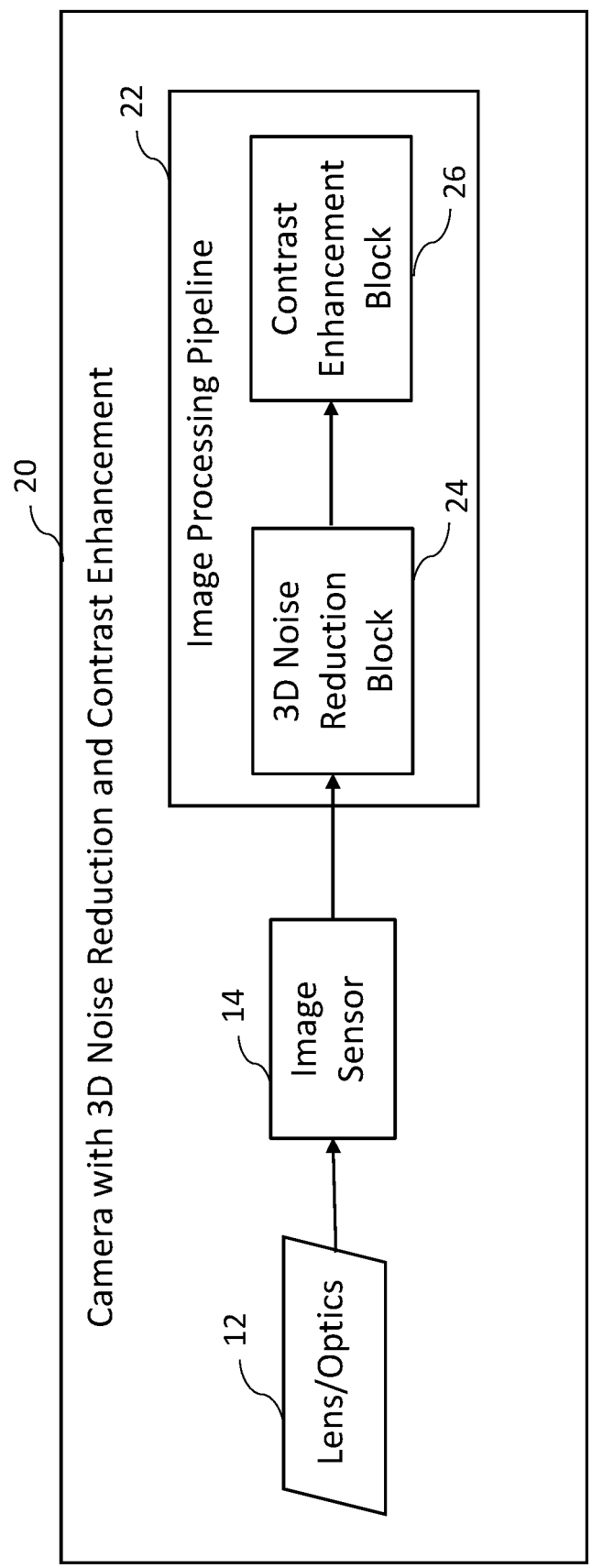
FIG. 2 shows a high-level block diagram of a camera with a modified image processing pipeline for 3D noise reduction and contrast enhancement, in accordance with one embodiment of the invention.

In accordance with one embodiment of the invention, and referring to FIG. 2 of the drawings, a camera pipeline comprises a lens 12, and an image sensor 14 which are components similar to what has already been described with respect to the prior art camera pipeline 10 of FIG. 1. Thus, the same reference numerals have been used to indicate these components. However, unlike the prior art camera pipeline 10, the output of the image sensor 14 is fed to a modified image processing pipeline 22 which includes a three-dimensional noise reduction block 24, and a contrast enhancement block 26.

As will be described, the three-dimensional noise reduction block 24 performs spatial filtering in two dimensions, and temporal filtering in one dimension, hence the noise reduction techniques are performed by the block 24 is referred to herein as three-dimensional noise reduction.

Two-Dimensional Spatial Filtering

Figure 3:
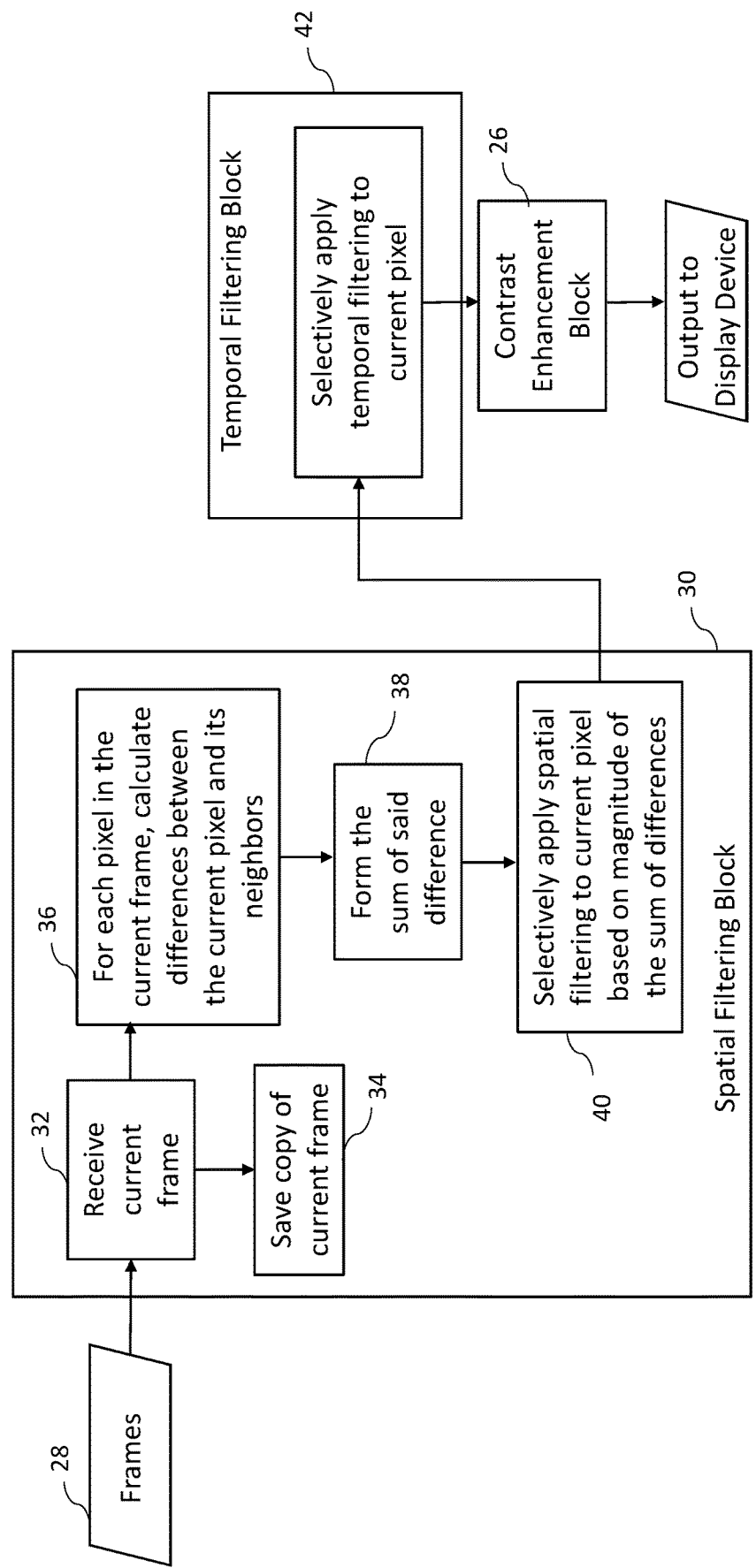
FIG. 3 shows a flowchart of operations performed in order to spatially the pixels, in accordance with one embodiment of the invention.
Figure 4:
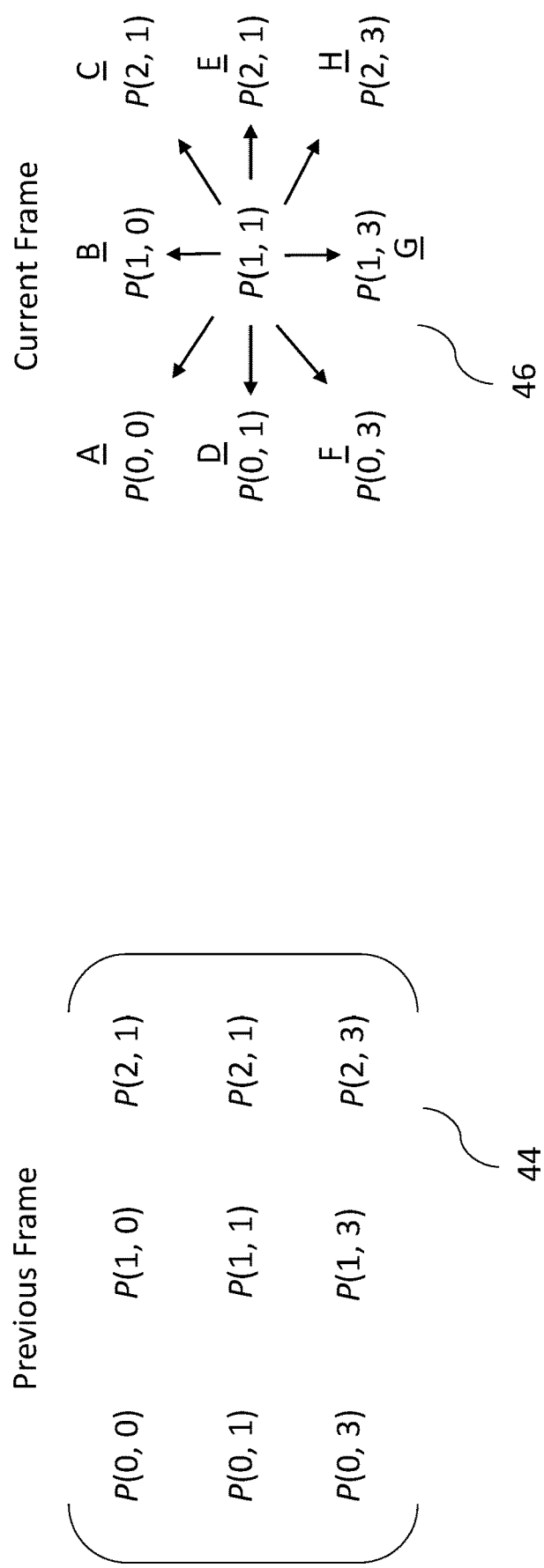
FIG. 4 shows a schematic representation of a current and previous frame.

Referring to FIG. 3, in one embodiment, the 3D noise reduction block 24 may comprise a spatial filtering block 30 configured to receive input frames 28, whereupon a spatial filtering technique is applied on a frame-by-frame basis, as will now be described. The technique begins by receiving the current frame at block 32, a copy of which is immediately saved at block 34 to a temporal buffer. The saved copy of the current frame is used in a temporal filtering block which will be described later. Next, for each pixel in the current frame, differences between the current pixel and its neighbors are calculated. The calculation of the differences between the current pixel and its neighbors is performed at block 36. To illustrate how the differences are calculated, consider the current frame numeral 46 depicted in in FIG. 4 of the drawings. For illustrative purposes the current frame shows only nine pixels P(x,y). In reality, one of ordinary skill in the art would understand that the current frame may comprise more pixels based on the resolution of the image. Consider the pixel P(1,1) which is located at the center of the frame. The arrows leading from the pixel P(1,1) indicate each of its neighboring pixels. Calculating the differences between the occurrence pixel and its neighbors in this case simply means calculating the following differences:

$P(1,1)-P(0,0)$ $P(1,1)-P(1,0)$ $P(1,1)-P(2,0)$ $P(1,1)-P(0,1)$ $P(1,1)-P(2,1)$ $P(1,1)-P(0,3)$ $P(1,1)-P(1,3)$ $P(1,1)-P(2,3)$.

If the current pixel has no neighbors, such as is the case for the pixel P(0,0), then padding of pixels may be performed. In one embodiment, the particular padding technique used comprises simply taking the value of the current pixel as the value of the padded pixels.

Referring again to FIG. 3 of the drawings, at block 38 the sum of the differences calculated in the previous step is computed. This sum of the computed differences is used in block 40 to selectively apply spatial filtering to the current pixel as follows:

If the sum is greater than a threshold then the current pixel is not changed, in other words no spatial filtering is applied to the current pixel. However, if the sum is less than threshold, then the current pixel is replaced with a value corresponding to the sum of the computed differences calculated at block numeral 38.

In the technique described above, the spatial filtering block numeral 30 calculates for each pixel "s" in frame time t, a new pixel value is in the spatial domain where the pixel's neighbors are included in the summation of diffused values. In the example described, all the current pixel's neighbors (A, B, C, D, E, F, and G—see frame 40) are used in the calculation. In some embodiments, not all the pixel's neighbors is used in the calculation. For example, only the four pixels B, D, E, and F may be used.

To achieve the filtering, firstly the current pixel is filtered with the surrounding pixels in the same frame as follows:

$$T\_weight\_spatial = \Sigma\psi(I(t,p)-I(t,s));$$

where I represents pixel intensity; and (t,s) is the current pixel in the current frame. Thus, the above calculation sums the "differences" over all 'p's—the surrounding pixels in the same frame as discussed above. 's' is the center pixel P(1,1), and 'p's are the neighboring pixels;

The spatially-filtered sample is output in accordance with the following equation:

$$Spatial\_filtered\_sample = I(t,s) + \lambda * T\_weight\_spatial;$$

where the "Spatial_filtered_sample" is the output of spatial filtering on the current pixel.

in some embodiments, $\lambda$ may be 0.603.

As noted above, the spatial filtering is selective in that the current pixel value is only altered in certain cases. In one embodiment, spatial filtering of the current pixel only occurs if the sum of differences is below a threshold rho as follows:

For a constant "rho", proportional to the variance of the noise:

$$\psi(x)=(1-(x/rho)^2)^2; \text{ if } |x|<=rho;$$

$$\psi(x)=0; \text{ if } |x|>rho;$$

In one embodiment, rho may be set to be 3 or 4. The above calculations are performed for each channel within the color space separately. For example, for the RGB color space, the above calculations are performed separately for each of the R, G, and B pixels.

In accordance with the above spatial filtering, if the sum of the differences is greater than rho then the current pixel is left unchanged ($\psi(x)=0$), otherwise and adapted diffusion is applied to the current pixel in terms of the formula $\psi(x)=(1-(x/rho)^2)^2$.

Temporal Filtering

Referring again to FIG. 3 of the drawings, temporal filtering is applied at block 42. In one embodiment, for temporal filtering, each pixel in a new current frame is (t) received at block 32 is compared to the corresponding co-sited pixel from the previous frame (t−1) that was saved in the temporal buffer at block numeral 34. In particular, I(t, s), the intensity of each pixel of the current frame is compared to the intensity of the co-sited pixel I(t−1, s) of the previous frame time (t−1). For example, referring to FIG. 4, the current frame is represented by reference numeral 46, whereas the previous frame is represented by reference numeral 44; and the co-sited pixels the same have the same (x,y) coordinates. Temporal filtering may then be performed in accordance with the following formula:

$$T\_weight\_temporal = \psi(I(t-1,s)-I(t,s)).$$

The output of the temporal filtering is a temporally filtered pixel calculated in accordance with the following formula:

$$Temporal\_filtered\_sample = spatial\_filtered\_sample + \lambda * T\_weight\_temporal.$$

This new pixel "s" and co-sited past frame pixel "p" are used in above spatial—temporal calculation. The result of the calculation is stored in the past frame storage (temporal buffer). It serves as the input for the following spatial contrast enhancement and may be sent out as the output of the spatial-temporal filter if contrast enhancement is not required.

Contrast Enhancement

In one embodiment, for each pixel s in the temporal buffer, an adaptive diffusion in the spatial domain is calculated as follows:

$$T\_weight(s) = \Sigma\psi(I(t,p)-I(t,s));$$

I(t+1, s)=I(t, s)+$\lambda$*T_weight(s); if |T_weight(s)|>0; This means we filtered the current sample; and I(t+1, s)=I(t, s)+k*H(s); if |T_weight(s)| equals 0; This means this sample is sitting on an edge;

where H(s) is the contrast enhancement function described below and it is weighted by a constant k.

Contrast Enhancement Function

In one embodiment, the contrast enhancement function may utilize edge detectors, in the form of Laplacian and Sobel operators. The Laplacian is a second order derivative operator so that it is very sensitive to random noise. For this reason, it is better to modulate the output of the Laplacian operator by a more structured first order Sobel operator. The Laplacian operator also provides the sign of the contrast enhancement.

The Sobel is defined as the sum of absolute values of the horizontal and vertical gradient operator:

$$Sobel = abs(Gx(s)) + abs(Gy(s));$$

In one embodiment, small Sobel values may be set to zero and large Sobel values may be claimed as follows:

If (Sobel<c1)Sobel=0; where c1 is a constant; and

If (Sobel>c2)Sobel=c2; where c2 is a constant.

In some embodiments, c1 may be 32 and c2 any be 128. The contrast enhancement value H(s) may then be calculated as follows:

H(s)=Laplacian(s)*Sobel(s).

The contrast enhancement techniques described above is performed by the contrast announcement block 26 shown in FIG. 1 of the drawings.

Figure 5:
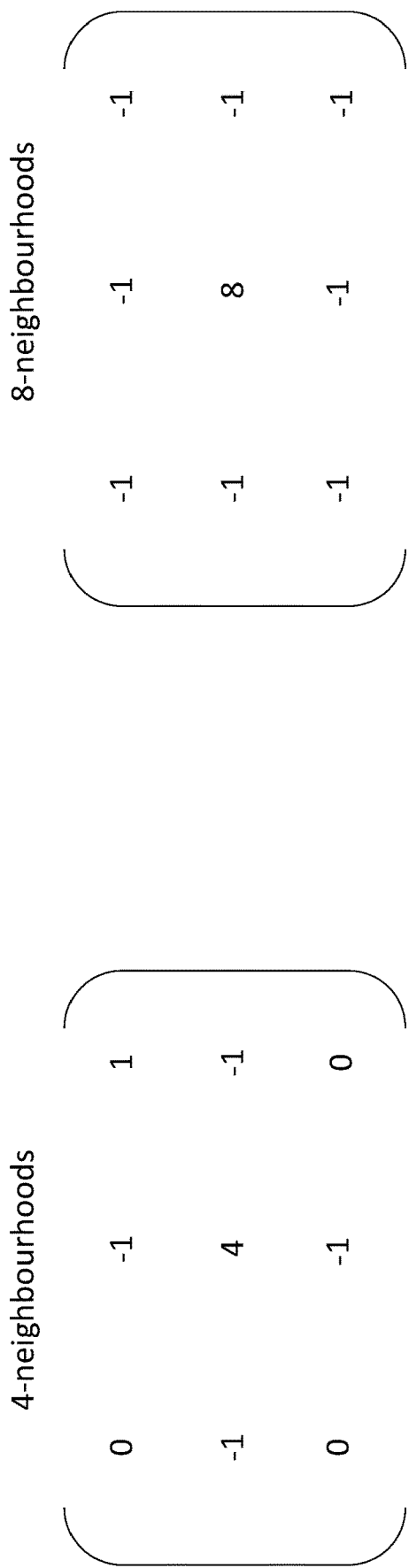
FIG. 5 shows a representation of a Laplacian operator used for edge detection, in accordance with one embodiment of the invention.
Figure 6:
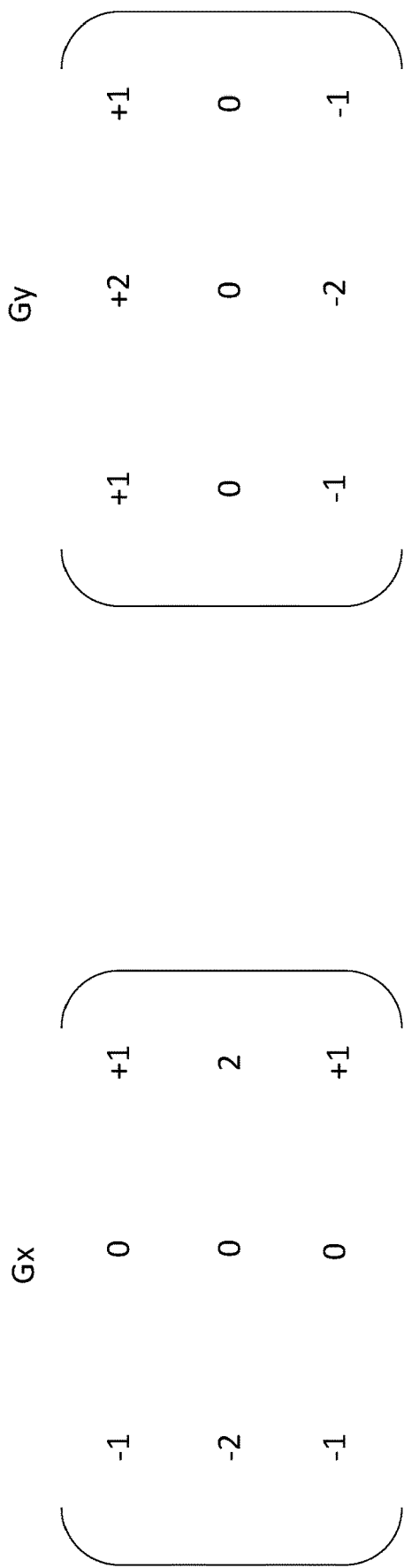
FIG. 6 shows a representation of a Sobel operator used for edge detection in accordance with one embodiment of the invention.

FIGS. 5 and 6 show representations of a Laplacian and Sobel operator, respectively used for edge detection in accordance with one embodiment of the invention.

As will be appreciated by one skilled in the art, the aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A method for a camera, comprising:
generating, by an image sensor, a current frame;
receiving, in an image processing pipeline, the current frame from the image sensor;
calculating, in a spatial filtering block of said image processing pipeline, a spatial weight for each pixel s in the current frame, wherein said spatial weight is computed based on a summation of diffused values associated with the pixel s;
selectively filtering, as a step within said image processing pipeline, an intensity I of the pixel s spatially using said spatial weight; and
controlling display of the current frame based on the selective filtering.

2. The method of claim 1, wherein the diffused values comprise intensity differences between the pixel s and its neighbors in a spatial domain.

3. The method of claim 1, wherein the diffused values are calculated according to the formula:

T_weight_spatial=Σψ(I(t,p)−I(t,s));

where I represents pixel intensity; and
(t,s) specifies each pixel s in the current frame.

4. The method of claim 3, wherein filtering the intensity I of the pixel s spatially is according to the formula:

Spatial_filtered_sample=I(t,s)+λ*T_weight_spatial;

where λ is a constant.

5. The method of claim 4, wherein selectively filtering the intensity I of the pixel s spatially comprises selecting a constant value rho such that:

ψ(x)=(1−(x/rho)^2)^2; if |x|<=rho;

ψ(x)=0; if |x|>rho.

6. The method of claim 5, wherein rho is selected to be proportional to a variance of noise in the current frame.

7. The method of claim 6, further comprising selectively filtering said intensity temporally based on a temporal weight calculated between the intensity I of the pixel s in the current frame and its value from an immediately preceding frame.

8. The method of claim 7, wherein the temporal weight is calculated according to the formula:

T_weight_temporal=ψ(I(t−1,s)−I(t,s));

where I(t, s) is the intensity of the pixel s in current frame; and
I(t−1, s) is its intensity from the immediately preceding frame (t−1).

9. The method of claim 8, further comprising outputting a temporally filtered pixel calculated in accordance with the following formula:

Temporal_filtered_sample=spatial_filtered_sample+ λ*T_weight_temporal;

where λ is a constant.

10. The method of claim 9, further comprising enhancing contrast in the current frame by applying a contrast enhancement function H(s) to each pixel s with value altered due to the spatial filtering.

11. The method of claim 10, wherein the contrast enhancement function comprises an edge detection algorithm.

12. An image processing system, comprising:
a lens;
at least one image sensor coupled to the lens, wherein the at least one image sensor is configured to generate a current frame; and
an image processing pipeline, comprising:
a spatial filtering block configured to receive the current frame from the at least one image sensor;
calculate a spatial weight for each pixel s in the current frame, wherein said spatial weight is computed based on a summation of diffused values associated with the pixel s;
selectively filter an intensity I of the pixel s spatially using said spatial weight; and
control display of the current frame based on the selective filtering.

13. The image processing system of claim 12, wherein the diffused values comprise intensity differences between the pixel s and its neighbors in a spatial domain.

14. The image processing system of claim 12, wherein the diffused values are calculated according to the formula:

$$T\_weight\_spatial = \Sigma \psi(I(t,p) - I(t,s));$$

where I represents pixel intensity; and (t,s) specifies each pixel s in the current frame.

15. The image processing system of claim 14, wherein filtering the intensity I of the pixel s spatially is according to the formula:

$$Spatial\_filtered\_sample = I(t,s) + \lambda * T\_weight\_spatial;$$

where $\lambda$ is a constant.

16. The image processing system of claim 15, wherein selectively filtering the intensity I of the pixel s spatially comprises selecting a constant value rho such that:

$$\psi(x) = (1 - (x/rho)^2)^2; \text{ if } |x| <= rho;$$

$$\psi(x) = 0; \text{ if } |x| > rho.$$

17. The image processing system of claim 16, wherein rho is selected to be proportional to a variance of noise in the current frame.

18. The image processing system of claim 17, wherein the method further comprises selectively filtering said intensity based on a temporal weight calculated between the intensity I of the pixel s in the current frame and its value from an immediately preceding frame.

19. The image processing system of claim 18, wherein the temporal weight is calculated according to the formula:

$$T\_weight\_temporal = \psi(I(t-1,s) - (t,s));$$

where I(t, s) is the intensity of the pixel s in current frame; and

I(t−1, s) is its intensity from the immediately preceding frame (t−1).

20. The image processing system of claim 19, further comprising outputting a temporally filtered pixel calculated in accordance with the following formula:

$$Temporal\_filtered\_sample = spatial\_filtered\_sample + \lambda * T\_weight\_temporal;$$

where $\lambda$ is a constant.

21. The image processing system of claim 12, further comprising a contrast enhancement configured to apply a contrast enhancement function H(s) to each pixel s with value altered due to the spatial filtering.

* * * * *